(12) United States Patent
Minagawa et al.

(10) Patent No.: US 11,749,840 B2
(45) Date of Patent: Sep. 5, 2023

(54) NON-AQUEOUS ELECTROLYTE SECONDARY BATTERY AND CHARGING METHOD

(71) Applicant: ELIIY POWER CO., LTD., Tokyo (JP)

(72) Inventors: Atsuhiko Minagawa, Shinagawa-ku (JP); Hideyuki Sugiyama, Shinagawa-ku (JP)

(73) Assignee: ELIIY POWER CO., LTD., Tokyo (JP)

( * ) Notice: Subject to any disclaimer, the term of this patent is extended or adjusted under 35 U.S.C. 154(b) by 836 days.

(21) Appl. No.: 16/487,307

(22) PCT Filed: Feb. 22, 2018

(86) PCT No.: PCT/JP2018/006544
§ 371 (c)(1),
(2) Date: Apr. 24, 2020

(87) PCT Pub. No.: WO2018/155582
PCT Pub. Date: Aug. 30, 2018

(65) Prior Publication Data
US 2020/0176757 A1 Jun. 4, 2020

(30) Foreign Application Priority Data
Feb. 24, 2017 (JP) .................................. 2017-034137

(51) Int. Cl.
*H01M 10/0568* (2010.01)
*H01M 10/0525* (2010.01)
*H01M 4/133* (2010.01)
*H01M 4/58* (2010.01)
*H01M 10/0569* (2010.01)
*H01M 4/02* (2006.01)

(52) U.S. Cl.
CPC ....... *H01M 10/0568* (2013.01); *H01M 4/133* (2013.01); *H01M 4/5825* (2013.01); *H01M 10/0525* (2013.01); *H01M 10/0569* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2004/0219428 A1* | 11/2004 | Nagayama | .......... | H01M 4/5825 |
| | | | | 429/210 |
| 2011/0076557 A1* | 3/2011 | Ishii | .................... | H01M 4/5825 |
| | | | | 429/231.3 |
| 2011/0287304 A1* | 11/2011 | Zinck | .................. | H01M 4/5825 |
| | | | | 429/163 |
| 2016/0285100 A1 | 9/2016 | Tanizaki et al. | | |

FOREIGN PATENT DOCUMENTS

| | | | |
|---|---|---|---|
| JP | 2010-218937 | * | 9/2010 |
| JP | 2010-218937 A | | 9/2010 |
| JP | 2012-089348 A | | 5/2012 |
| JP | 2016-184521 A | | 10/2016 |

OTHER PUBLICATIONS

Japan Patent Office, International Search Report issued in corresponding Application No. PCT/JP2018006544, dated May 29, 2018.

* cited by examiner

*Primary Examiner* — Laura Weiner
(74) *Attorney, Agent, or Firm* — Stites & Harbison PLLC; Jeffrey A. Haeberlin; Trevor T. Graves (57) ABSTRACT

A non-aqueous electrolyte secondary battery of the present invention includes: a positive electrode in which an olivine-type compound is used as a positive electrode active material; a negative electrode in which amorphous-based carbon is used as a negative electrode active material; a separator sandwiched between the positive electrode and the negative electrode; a non-aqueous electrolyte; and a casing which houses the positive electrode, the negative electrode, the separator, and the non-aqueous electrolyte. The positive electrode, the negative electrode, and the non-aqueous electrolyte are configured to satisfy an inequality: $(Rn/(Rp+Rn)) \leq 0.54$, where $Rp$ is a positive electrode internal resistance attributed to both the positive electrode and a positive electrode reaction during charging of the secondary battery, $Rn$ is a negative electrode internal resistance attributed to both the negative electrode and a negative electrode reaction during charging of the secondary battery, and $(Rp+Rn)$ is an inter-terminal internal resistance of the secondary battery during charging of the secondary battery.

2 Claims, 2 Drawing Sheets

NON-AQUEOUS ELECTROLYTE SECONDARY BATTERY AND CHARGING METHOD

TECHNICAL FIELD

The present invention relates to a non-aqueous electrolyte secondary battery and a charging method

BACKGROUND ART

Lithium ion secondary batteries are practically used for various applications such as mobile phones, digital cameras, laptop computers, power supplies for electric vehicles, and storage batteries for home use.

However, it is known that charge-discharge characteristics of a lithium ion secondary battery are impaired at low temperatures (for example, see Patent Document 1). In particular, regarding generic lithium ion secondary batteries, a lower limit of a charging temperature range is generally set at 0° C.

However, lithium ion secondary batteries are being used for broader applications and have been required to be used outdoors in winter, for example. For example, for an application of starting a motorcycle, industrial applications installed outdoors, and the like, charging and recharging at low temperatures are required.

PRIOR ART DOCUMENT

Patent Document

Patent Document 1: Japanese Patent Laid-Open Publication No. 2016-184521

SUMMARY OF THE INVENTION

Problems to be Solved by the Invention

At low temperatures, because a reaction rate of an intercalation reaction of ions on a negative electrode active material becomes low, metallic lithium easily precipitates when a lithium ion secondary battery is charged at low temperatures. When metallic lithium has been precipitated, life characteristics of the secondary battery become impaired.

The present invention has been made in view of such an issue and provides a non-aqueous electrolyte secondary battery in which precipitation of metallic lithium during low-temperature charging can be prevented and which has excellent life characteristics.

Solutions to the Problems

The present invention provides a non-aqueous electrolyte secondary battery which includes: a positive electrode in which an olivine-type compound is used as a positive electrode active material; a negative electrode in which amorphous-based carbon is used as a negative electrode active material; a separator sandwiched between the positive electrode and the negative electrode; a non-aqueous electrolyte; and a casing which houses the positive electrode, the negative electrode, the separator, and the non-aqueous electrolyte. The positive electrode, the negative electrode, and the non-aqueous electrolyte are configured to satisfy an inequality: $(R_n/(R_p+R_n)) \leq 0.54$, where $R_p$ is a positive electrode internal resistance attributed to both the positive electrode and a positive electrode reaction during charging of the secondary battery, $R_n$ is a negative electrode internal resistance attributed to both the negative electrode and a negative electrode reaction during charging of the secondary battery, and $(R_p+R_n)$ is an inter-terminal internal resistance of the secondary battery during charging of the secondary battery.

Effects of the Invention

The non-aqueous electrolyte secondary battery of the present invention includes: the positive electrode in which an olivine-type compound is used as a positive electrode active material; the negative electrode in which amorphous-based carbon is used as a negative electrode active material; the separator sandwiched between the positive electrode and the negative electrode; the non-aqueous electrolyte; and the casing which houses the positive electrode, the negative electrode, the separator, and the non-aqueous electrolyte. Therefore, the secondary battery can be charged by applying a voltage between the positive electrode and the negative electrode. In addition, the charged secondary battery can be discharged.

By using an olivine-type compound as the positive electrode active material, safety of the secondary battery can be improved. Further, since an olivine-type compound is used as the positive electrode active material, the positive electrode internal resistance $R_p$ becomes large, and the proportion of the negative electrode internal resistance $R_n$ in the inter-terminal internal resistance value $(R_p+R_n)$ of the secondary battery can be reduced.

The positive electrode, the negative electrode, and the non-aqueous electrolyte included in the secondary battery of the present invention are configured to satisfy the inequality $(R_n/(R_p+R_n)) \leq 0.54$. Therefore, the secondary battery of the present invention has excellent cycle characteristics at low temperatures. This is proven by experiments performed by the inventors of the present invention. Therefore, the secondary battery of the present invention can prevent or reduce precipitation of metallic lithium during low-temperature charging and therefore has excellent life characteristics.

EMBODIMENT OF THE INVENTION

A non-aqueous electrolyte secondary battery of the present invention includes: a positive electrode in which an olivine-type compound is used as a positive electrode active material; a negative electrode in which amorphous-based carbon is used as a negative electrode active material; a separator sandwiched between the positive electrode and the negative electrode; a non-aqueous electrolyte; and a casing which houses the positive electrode, the negative electrode, the separator, and the non-aqueous electrolyte. The positive electrode, the negative electrode, and the non-aqueous electrolyte are configured to satisfy an inequality $(R_n/(R_p+R_n))$ ≤0.54, where Rp is a positive electrode internal resistance attributed to both the positive electrode and a positive electrode reaction during charging of the secondary battery, Rn is a negative electrode internal resistance attributed to both the negative electrode and a negative electrode reaction during charging of the secondary battery, and (Rp+Rn) is an inter-terminal internal resistance of the secondary battery during charging of the secondary battery.

The positive electrode, the negative electrode, and the non-aqueous electrolyte included in the non-aqueous electrolyte secondary battery of the present invention are preferably formed so that an open-circuit potential of the negative electrode is higher than or equal to 0.1 V (vs. Li/Li$^+$) in the state where a state of charge (SOC) of the secondary battery is 0% to 100%. This can prevent or reduce precipitation of metallic lithium during low-temperature charging.

The negative electrode included in the non-aqueous electrolyte secondary battery of the present invention is preferably formed so that a utilization capacity of the negative electrode active material is smaller than or equal to 190 mAh/g. This can prevent or reduce precipitation of metallic lithium during low-temperature charging.

The positive electrode included in the non-aqueous electrolyte secondary battery of the present invention preferably includes: a positive electrode current collector in a sheet shape; and a positive electrode active material layer provided on the positive electrode current collector. In addition, the negative electrode preferably includes: a negative electrode current collector in a sheet shape; and a negative electrode active material layer provided on the negative electrode current collector.

The negative electrode active material layer included in the negative electrode preferably contains amorphous-based carbon as the negative electrode active material and preferably has a porosity lower than or equal to 53%. This can prevent or reduce precipitation of metallic lithium during low-temperature charging.

The positive electrode active material is preferably lithium iron phosphate, and the non-aqueous electrolyte preferably contains a lithium salt and a carbonate compound.

The present invention also provides a charging method in which a charging voltage is controlled to be lower than or equal to 3.75 V in the state where the state of charge (SOC) of the secondary battery of the present invention is 0% to 100%. By the charging method of the present invention, it is possible to prevent or reduce precipitation of metallic lithium in low-temperature charging.

Hereinafter, an embodiment of the present invention will be described with reference to the drawings. The configuration shown in the drawings and the following description is just an example, and the scope of the present invention is not limited to the configuration shown in the drawings or the following description.

Figure 1:
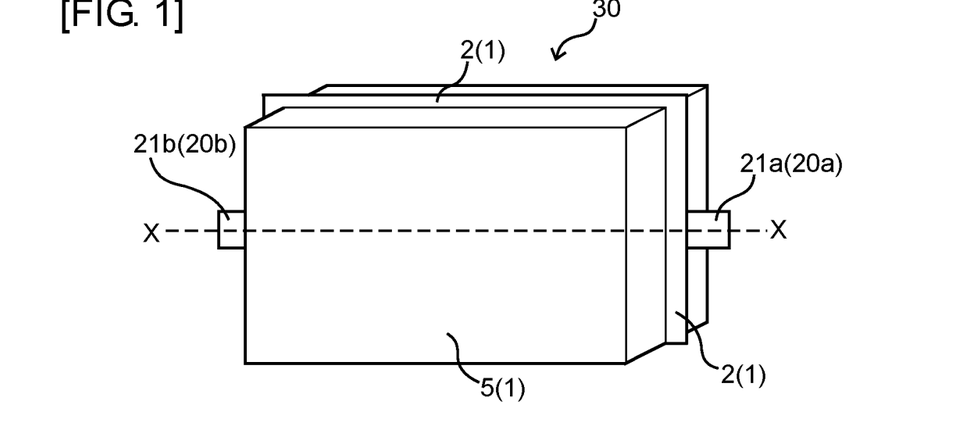
FIG. 1 is a schematic perspective view of a non-aqueous electrolyte secondary battery of an embodiment of the present invention.
Figure 2:
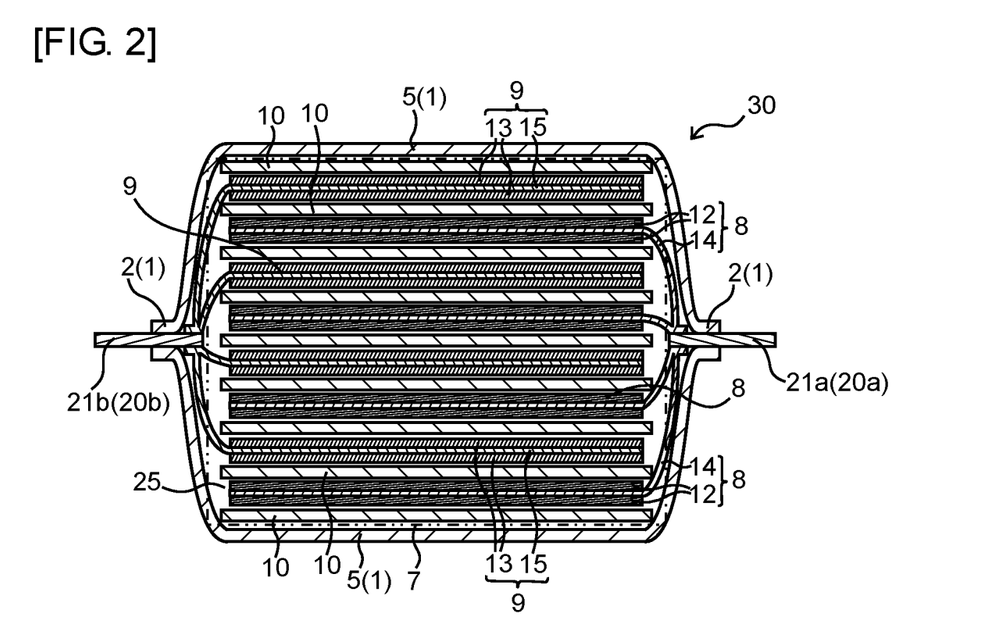
FIG. 2 is a schematic cross-sectional view along a broken line X-X of FIG. 1 of the non-aqueous electrolyte secondary battery.

FIG. 1 is a schematic perspective view of the non-aqueous electrolyte secondary battery of the present embodiment, and FIG. 2 is a schematic cross-sectional view of the non-aqueous electrolyte secondary battery along a broken line X-X of FIG. 1.

A non-aqueous electrolyte secondary battery 30 of the present embodiment includes: a positive electrode 8 in which an olivine-type compound is used as a positive electrode active material; a negative electrode 9 in which amorphous-based carbon is used as a negative electrode active material; a separator 10 sandwiched between the positive electrode 8 and the negative electrode 9; a non-aqueous electrolyte 25; and a casing 1 which houses the positive electrode 8, the negative electrode 9, the separator 10, and the non-aqueous electrolyte 25. The positive electrode 8, the negative electrode 9, and the non-aqueous electrolyte 25 are configured to satisfy an inequality (Rn/(Rp+Rn))≤0.54, where Rp is a positive electrode internal resistance attributed to both the positive electrode 8 and a positive electrode reaction during charging of the secondary battery 30, Rn is a negative electrode internal resistance attributed to both the negative electrode 9 and a negative electrode reaction during charging of the secondary battery 30, and (Rp+Rn) is an inter-terminal internal resistance of the secondary battery 30 during charging of the secondary battery 30.

Hereinafter, the non-aqueous electrolyte secondary battery 30 of the present embodiment will be described.

The non-aqueous electrolyte secondary battery 30 of the present invention is a secondary battery using a non-aqueous electrolyte as an electrolyte and is, for example, a lithium ion secondary battery.

The casing 1 is a battery casing that houses the positive electrode 8, the negative electrode 9, the separator 10, and the non-aqueous electrolyte 25. The casing 1 may be made in a bag shape made by welding a lamination film. In this case, the non-aqueous electrolyte secondary battery 30 is a pouch battery. Alternatively, the casing 1 may be a metal case or a hard resin case.

The positive electrode 8 is an electrode using an olivine-type compound as the positive electrode active material. The positive electrode active material is a substance directly involved in electron transfer associated with electric charge transfer on the positive electrode. Since an olivine-type compound is used as the positive electrode active material, safety of the non-aqueous electrolyte secondary battery 30 can be improved. Further, the positive electrode internal resistance Rp becomes large, and the proportion of the negative electrode internal resistance Rn in the inter-terminal internal resistance (Rp+Rn) of the secondary battery can be reduced.

The olivine-type compound serving as the positive electrode active material is a substance having an olivine-type crystal structure, and examples include LiFePO$_4$, LiMnPO$_4$, Li$_x$M$_y$PO$_4$, where 0.05≤x≤1.2, 0≤y≤1, and M includes at least one or more kinds of Fe, Mn, Cr, Co, Cu, Ni, V, Mo, Ti, Zn, Al, Ga, Mg, B, and Nb.

The positive electrode 8 can include: a positive electrode current collector 14 in a sheet shape; and the positive electrode active material layer 12 provided on the positive electrode current collector 14. The positive electrode current collector 14 is a sheet serving as a substrate on which the positive electrode active material layer 12 is provided, and the positive electrode current collector 14 is a conductor electrically connecting the electrode connection terminal 20a and the positive electrode active material layer 12 to each other. The positive electrode current collector 14 is, for example, an aluminum foil.

The positive electrode active material layer 12 is a layer containing a positive electrode active material. The positive electrode active material layer 12 may be provided on one side of the positive electrode current collector 14 or may be provided on both sides of the positive electrode current collector 14. The positive electrode active material layer 12 can contain positive electrode active material fine particles. Further, the positive electrode active material fine particles may have a conductive film on the surface. This arrangement can improve conductivity of the surfaces of the fine particles on which an intercalation reaction is progressing, and can reduce the internal resistance of the positive electrode. The conductive film is, for example, a carbon film.

The positive electrode active material layer 12 can contain a conductive agent. Therefore, the conductivity of the positive electrode active material layer 12 can be improved and can thus reduce the internal resistance of the positive electrode. The conductive agent is, for example, acetylene black. Alternatively, the conductive agent may be fine particles of a coke-derived soft carbon, which is easy graphitization carbon.

The positive electrode active material layer 12 can contain a binder. The binder is, for example, polyvinylidene fluoride (PVdF), polytetrafluoroethylene (PTFE), styrene-butadiene copolymer (SBR), acrylonitrile rubber, or a mixture of acrylonitrile rubber and PTFE.

For example, powder of a positive electrode active material, a conductive agent, and a binder are mixed to prepare a paste, and this paste is applied on the positive electrode current collector 14. Then, the applied layer is dried and subjected to a press treatment so that the positive electrode active material layer 12 can be formed. Examples of a solvent used for preparing the paste include dimethylformamide, N-methylpyrrolidone, isopropanol, and toluene.

The negative electrode 9 is an electrode in which amorphous-based carbon is used as a negative electrode active material. The negative electrode active material is a substance directly involved in electron transfer associated with electric charge transfer on the negative electrode.

The amorphous-based carbon serving as the negative electrode active material includes amorphous carbon, microcrystalline carbon, or both. The amorphous-based carbon is, for example, soft carbon.

The negative electrode 9 can include: a negative electrode current collector 15 in a sheet shape; and a negative electrode active material layer 13 provided on the negative electrode current collector 15. The negative electrode current collector 15 is a sheet serving as a substrate on which the negative electrode active material layer 13 is provided, and the negative electrode current collector 15 is a conductor electrically connecting the electrode connection terminal 20b and the negative electrode active material layer 13 to each other. The negative electrode current collector 15 is, for example, a copper foil.

The negative electrode active material layer 13 is a layer containing a negative electrode active material. The negative electrode active material layer 13 may be provided on one side of the negative electrode current collector 15 or may be provided on both sides of the negative electrode current collector 15. The negative electrode active material layer 13 can contain, for example, fine particles of a negative electrode active material.

The negative electrode active material layer 13 can contain a binder. The binder is, for example, polyvinylidene fluoride (PVdF), polytetrafluoroethylene (PTFE), styrene-butadiene copolymer (SBR), acrylonitrile rubber, or a mixture of acrylonitrile rubber and PTFE.

The negative electrode active material layer 13 can contain a thickening agent. The thickening agent is, for example, carboxymethylcellulose sodium (CMC).

For example, powder of a negative electrode active material, a binder, and a thickening agent are mixed to prepare a paste, and this paste is applied on the negative electrode current collector 15. Then, the applied layer is dried and subjected to a press treatment so that the negative electrode active material layer 13 can be formed. Examples of a solvent used for preparing the paste include dimethylformamide, N-methylpyrrolidone, isopropanol, toluene, and the like.

The negative electrode 9 can be provided such that a utilization capacity of the negative electrode active material is smaller than or equal to 190 mAh/g. This can prevent or reduce precipitation of metallic lithium when the non-aqueous electrolyte secondary battery 30 is charged at low-temperatures. The utilization capacity of the negative electrode active material can be adjusted by changing a ratio of an amount of negative electrode active material contained in the negative electrode 9 to an amount of the positive electrode active material contained in the positive electrode 8.

The negative electrode active material layer 13 can have a porosity lower than or equal to 53%. This can prevent or reduce precipitation of metallic lithium when the non-aqueous electrolyte secondary battery 30 is charged at low-temperatures. The porosity of the negative electrode active material layer 13 can be adjusted by, for example, adjusting a pressing pressure when the negative electrode active material layer 13 is formed.

The separator 10 has a sheet shape and is disposed between the positive electrode 8 and the negative electrode 9. Further, the separator 10 can configure, together with the positive electrodes 8 and the negative electrodes 9, an electrode assembly 7 as shown in FIG. 2. By providing the separator 10, it is possible to prevent a short-circuit current from flowing between the positive electrode 8 and the negative electrode 9.

There is no particular limitation on the separator 10 if a short-circuit current can be prevented from flowing and if ions conducting between the positive electrode and the negative electrode can pass through the separator 10, and a microporous film of polyolefin, a cellulose sheet, or an aramid sheet can be used, for example.

The non-aqueous electrolyte 25 is housed in the casing 1 and serves as an ion conduction medium between the positive electrode and the negative electrode. Further, the non-aqueous electrolyte 25 contains a non-aqueous solvent and an electrolyte salt dissolved in the non-aqueous solvent.

As the non-aqueous solvent contained in the non-aqueous electrolyte 25, it is possible to use a carbonate compound (a cyclic carbonate compound, a chain carbonate compound, or the like), lactone, ether, ester, or the like, and two or more kinds of these solvents may be mixed and used. In particular, a cyclic carbonate compound and a chain carbonate compound of these solvents are preferably mixed and used.

As the electrolyte salt contained in the non-aqueous electrolyte 25, examples include $LiCF_3SO_3$, $LiAsF_6$, $LiClO_4$, $LiBF_4$, $LiPF_6$, LiBOB, $LiN(CF_3SO_2)_2$, $LiN(C_2F_5SO_2)_2$, and the like.

Further, the non-aqueous electrolyte 25 may be added with an additive agent such as a flame-resistant agent if needed.

The positive electrode 8, the negative electrode 9, and the non-aqueous electrolyte 25 can be provided so as to satisfy an inequation $(Rn/(Rp+Rn)) \leq 0.54$. This can prevent or reduce precipitation of metallic lithium when the non-aqueous electrolyte secondary battery 30 is charged at low-temperatures. In the inequation, Rp is a positive electrode internal resistance (DC resistance) attributed to (due to) both the positive electrode 8 and the positive electrode reaction during charging of the secondary battery 30, Rn is a negative electrode internal resistance (DC resistance) attributed to (due to) both the negative electrode 9 and the negative electrode reaction during charging of the secondary battery 30, and (Rp+Rn) is an inter-terminal internal resistance (DC resistance) of the secondary battery 30 during charging of the secondary battery 30.

(Rn/(Rp+Rn)) can be adjusted by adjusting, for example, the porosity of the negative electrode active material layer 13 or the utilization capacity of the negative electrode active material.

Rp and Rn are preferably measured in a state where the SOC is the same.

Rp and Rn are preferably measured when the SOC is greater than or equal to 10% and smaller than or equal to 90%. If Rp and Rn are measured in a state where the SOC is close to 0% or 100%, the measurement is easily affected by other causes; therefore, the measurement is preferably performed in a range where the SOC is greater than or equal to 10% and smaller than or equal to 90%. If the range is greater than or equal to 10% and smaller than or equal to 90%, a stable internal resistance value can be obtained, and a resistance value that does not change much can be therefore obtained over this range.

Rp may be a positive electrode internal resistance when the SOC is 20%, Rn may be the negative electrode internal resistance when the SOC is 20%, and (Rp+Rn) may be the inter-terminal internal resistance of the secondary battery 30 when SOC is 20%.

(Rn/(Rp+Rn)) can be measured, for example, by using the secondary battery 30 in which a reference electrode is provided. For example, in the state where the SOC is 20%, a terminal voltage, a potential of the negative electrode of the secondary battery 30 containing a reference electrode is measured during 10 seconds of charging at 0.2 ItA, 0.5 ItA, and 1 ItA. From the measured terminal voltages, the internal resistance value (Rp+Rn) of the secondary battery 30 can be calculated; and from the measured potentials (V vs. Li$^+$/Li) of the negative electrode, the negative electrode internal resistance value Rn can be calculated. From these values, (Rn/(Rp+Rn)) can be calculated. As a reference electrode, a metallic lithium electrode can be used. Alternatively, a positive electrode reference electrode can be disposed in the vicinity of the positive electrode 8, and a negative electrode reference electrode can be disposed in the vicinity of the negative electrode 9.

The positive electrode internal resistance value Rp includes: a charge transfer resistance on a boundary surface between the positive electrode 8 and the electrolyte 25; a solid-phase diffusion resistance in the positive electrode active material layer 12; a transfer resistance of Li ions in the electrolyte 25 between the positive electrode 8 and the reference electrode; and other resistances.

The negative electrode internal resistance value Rn includes: a charge transfer resistance on a boundary surface between the negative electrode 9, which is strictly an SEI (Solid Electrolyte Interphase) formed on the surface of the negative electrode 9, and the electrolyte 25; a solid-phase diffusion resistance in the negative electrode active material layer 13; a transfer resistance of Li ions in the electrolyte 25 between the negative electrode 9 and the reference electrode; and other resistances.

Further, it is considered that the secondary batteries 30 in which no reference electrode is provided has substantially the same inter-terminal internal resistance value (Rp+Rn), positive electrode internal resistance value Rp, and negative electrode internal resistance value Rn as the secondary battery 30 which is used for measurement and in which a reference electrode is provided, as long as the secondary battery 30 in which no reference electrode is provided has the same positive electrode active material layer 12, negative electrode active material layer 13, non-aqueous electrolyte 25, separator 10, and distance between the electrodes as the secondary battery 30 which is used for measurement and in which a reference electrode is provided. Further, even in another secondary battery 30 in which the lamination numbers of the positive electrodes 8 and the negative electrodes 9 have been changed, if the positive electrode active material layer 12, the negative electrode active material layer 13, the non-aqueous electrolyte 25, the separator 10, the distance between electrodes, and the like are the same, such secondary battery 30 is considered to have substantially the same (Rn/(Rp+Rn)) as the secondary battery 30 in which the reference electrode is provided.

The positive electrode 8, the negative electrode 9, and the non-aqueous electrolyte 25 can be provided such that an open-circuit potential of the negative electrode 9 is higher than or equal to 0.1 V (vs. Li/Li$^+$) in the state where a state of charge (SOC) of the secondary battery 30 is 0% to 100%. This can prevent or reduce precipitation of metallic lithium when the non-aqueous electrolyte secondary battery 30 is charged at low-temperatures. For example, by adjusting the porosity of the negative electrode active material layer 13 and the utilization capacity of the negative electrode active material of the negative electrode 9, the secondary battery 30 can be formed such that the open-circuit potential of the negative electrode 9 is higher than or equal to 0.1 V (vs. Li/Li$^+$).

The open-circuit potential of the negative electrode 9 can be calculated by, for example, adding up the operation potentials of the negative electrode 9 when the secondary battery 30 is being charged and is being discharged and by dividing the sum by 2.

The non-aqueous electrolyte secondary battery 30 can be charged while the charging voltage is being controlled lower than or equal to 3.75 V in the state where the state of charge (SOC) of the non-aqueous electrolyte secondary battery 30 is 0% to 100%. This can prevent or reduce precipitation of metallic lithium when the non-aqueous electrolyte secondary battery 30 is charged at low-temperatures.

EXPERIMENT (Fabrication of Test Cell of Working Example 1-1)

Lithium iron phosphate powder, which was a positive electrode active material, acetylene black, which was a conductive agent, and polyvinylidene fluoride (PVdF), which was a binder, were used to prepare a paste such that a solid content ratio after dried was lithium iron phosphate: acetylene black:PVdF=91:4:5. This paste was applied on one side of an aluminum foil, which was a positive electrode current collector, such that the coating mass was 0.75 g/100 cm$^2$, and was then dried to fabricate the positive electrode in which the positive electrode active material layer was provided on one side of the aluminum foil. The aluminum foil had a size of 53.5 mm×105.5 mm, and the positive electrode active material layer was provided in the area of 53.0 mm×93.0 mm inside that size. The porosity of the positive electrode active material layer was 42.3%.

Soft carbon, which was a negative electrode active material, styrene-butadiene copolymer (SBR), which was a binder, carboxymethylcellulose (CMC), which was a thickening agent, were used to prepare a paste such that a solid content ratio after dried was soft carbon:SBR:CMC=94:5:1. This paste was applied on one side of a copper foil, which was a negative electrode current collector, such that the coating mass was 0.47 g/100 cm$^2$, and was then dried and pressed to fabricate a negative electrode in which the negative electrode active material layer was provided on one side of the copper foil. The copper foil had a size of 54.5 mm×105.5 mm, and the negative electrode active material layer was provided in the area of 53.0 mm×95.0 mm inside that size. The porosity of the negative electrode active material layer was 47%.

One positive electrode, a separator, and one negative electrode were stacked such that the positive electrode active material layer and the negative electrode active material layer faced each other having a separator (thickness: 16 μm) made of a polyolefin-based material therebetween, and a circumference of the positive electrode and the negative electrode was covered with a separator by a single layer. On the outer side surface of the positive electrode, there was disposed one reference electrode (metallic lithium electrode) via the separator, and on the outer side surface of the negative electrode, there was disposed the other reference electrode (metallic lithium electrode) via the separator.

This laminated assembly was put in a casing made of a lamination film, and an opening of the casing except a liquid injection port was closed. After that, through the liquid injection port, an electrolyte solution (non-aqueous solvent: EC/DEC/EMC=27.5/5/67.5 (additive agent VC 0.7%, FEC 0.3%), lithium salt: $LiPF_6$ 1.2 mol/L) was injected into the casing, so that the laminated assembly was impregnated with the electrolyte solution, and the inside of the casing was then evacuated, and after that, the liquid injection port was then closed. In this manner, a test cell of Working Example 1-1 was fabricated.

(Fabrication of Test Cell of Working Example 1-2)

Lithium iron phosphate powder, acetylene black, and PVdF were used to prepare a paste such that a solid content ratio after dried was lithium iron phosphate:acetylene black:PVdF=91:4:5. This paste was applied on each of both sides of an aluminum foil, which was a positive electrode current collector, such that the coating mass for one side was 0.75 g/100 cm$^2$, and was then dried to fabricate the positive electrode in which the positive electrode active material layer was provided on both sides of the aluminum foil. The porosity of the positive electrode active material layer was 42.3%. Further, the positive electrode was fabricated in the same manner as the test cell of Working Example 1-1 except that the positive electrode active material layer was provided on both sides of the aluminum foil.

Soft carbon, SBR, and CMC were used to prepare a paste such that a solid content ratio after dried was soft carbon:SBR:CMC=94:5:1. This paste was applied on each of both sides of a copper foil, which was a negative electrode current collector, such that the coating mass for one side was 0.47 g/100 cm$^2$, and was then dried and pressed to fabricate the negative electrode in which the negative electrode active material layer was provided on both sides of the copper foil. The porosity of the negative electrode active material layer was 47%. Further, the negative electrode was fabricated in the same manner as the test cell of Working Example 1-1 except that the negative electrode active material layer was provided on both sides of the copper foil.

By laminating 30 positive electrodes, a separator, and 31 negative electrodes such that the positive electrodes and the negative electrodes were put one on top of another and that the separator (thickness: 16 μm) made of a polyolefin-based material was disposed between the positive electrode and the negative electrode adjacent to that positive electrode so that no short-circuit current could flow between the positive electrodes and the negative electrodes. This laminated assembly was put in a casing made of a lamination film, and an opening of the casing except a liquid injection port was closed. After that, through the liquid injection port, an electrolyte solution (non-aqueous solvent: EC/DEC/EMC=27.5/5/67.5 (additive agent VC 0.7%, FEC 0.3%), lithium salt: $LiPF_6$ 1.2 mol/L) was injected into the casing, so that the laminated assembly was impregnated with the electrolyte solution, and the inside of the casing was then evacuated, and after that, the liquid injection port was then closed. In this manner, the test cell of Working Example 1-2 was fabricated. Further, the same kind of separator, the same kind of electrolyte solution, and the same kind of casing as the test cell of Working Example 1-1 were used.

The test cell of Working Example 1-2 was fabricated such that Rn/(Rp+Rn) and the open-circuit potential of the negative electrode of the test cell of Working Example 1-2 were respectively substantially the same as Rn/(Rp+Rn) and the open-circuit potential of the negative electrode of the test cell of Working Example 1-1. Further, since the test cell of Working Example 1-2 has a larger battery capacity than the test cell of Working Example 1-1, it is easy to check a change in capacity retention.

(Fabrication of Test Cell of Working Example 2-1)

A negative electrode whose negative electrode active material layer had a porosity of 53% was fabricated by pressing a negative electrode active material layer at a lower pressure than in Working Example 1-1. Regarding the other fabrication processes, the same processes as for the test cell of Working Example 1-1 were used to fabricate the test cell of Working Example 2-1.

(Fabrication of Test Cell of Working Example 2-2)

A negative electrode whose negative electrode active material layer had a porosity of 53% was fabricated by pressing a negative electrode active material layer at a lower pressure than in Working Example 1-2. Regarding the other fabrication processes, the same processes as for the test cell of Working Example 1-2 were used to fabricate the test cell of Working Example 2-2. Further, the test cell of Working Example 2-2 was fabricated such that Rn/(Rp+Rn) and the open-circuit potential of the negative electrode of the test cell of Working Example 2-2 were respectively substantially the same as Rn/(Rp+Rn) and the open-circuit potential of the negative electrode of the test cell of Working Example 2-1.

(Fabrication of Test Cell of Comparative Example 1-1)

Soft carbon, SBR, and CMC were used to prepare a paste such that a solid content ratio after dried was 94:5:1. This paste was applied on one side of a copper foil, which was a negative electrode current collector, such that the coating mass was 0.38 g/100 cm$^2$, and was then dried to fabricate the negative electrode in which the negative electrode active material layer was provided on one side of the copper foil. Regarding the other fabrication processes, the same processes as for the test cell of Working Example 1-1 were used to fabricate the test cell of Comparative Example 1-1. Regarding the test cell of Comparative Example 1-1, since an amount of the soft carbon (negative electrode active material) contained in the negative electrode active material layer is small, the utilization capacity of the negative electrode active material is large.

(Fabrication of Comparative Example 1-2)

Soft carbon, SBR, and CMC were used to prepare a paste such that a solid content ratio after dried was 94:5:1. This paste was applied on each of both sides of a copper foil, which was a negative electrode current collector, such that the coating mass for one side was 0.38 g/100 cm$^2$, and was then dried to fabricate the negative electrode in which negative electrode active material layer was provided on both sides of the copper foil. Further, the negative electrode was fabricated by the same processes as the test cell of Comparative Example 1-1 except that the negative electrode active material layer was provided on both sides of the copper foil.

Except for using the fabricated negative electrode, a test cell of Comparative Example 1-2 was fabricated by the same processes as in Working Example 1-2. Further, the test cell of Comparative Example 1-2 was fabricated such that Rn/(Rp+Rn) and the open-circuit potential of the negative electrode of the test cell of Comparative Example 1-2 were respectively substantially the same as Rn/(Rp+Rn) and the open-circuit potential of the negative electrode of the test cell of Comparative Example 1-1. Regarding the test cell of Comparative Example 1-2, since an amount of the soft carbon (negative electrode active material) contained in the negative electrode active material layer is small, the utilization capacity of the negative electrode active material is large.

(Fabrication of Test Cell of Comparative Example 2-1)

A negative electrode whose negative electrode active material layer had a porosity of 62% was fabricated by pressing a negative electrode active material layer at a lower pressure than in Working Example 1-1. Regarding the other fabrication processes, the same processes as for the test cell of Working Example 1-1 were used to fabricate the test cell of Comparative Example 2-1.

(Fabrication of Test Cell of Comparative Example 2-2)

A negative electrode whose negative electrode active material layer had a porosity of 62% was fabricated by pressing a negative electrode active material layer at a lower pressure than in Working Example 1-2. Regarding the other fabrication processes, the same processes as for the test cell of Working Example 1-2 were used to fabricate the test cell of Comparative Example 2-2. Further, the test cell of Comparative Example 2-2 was fabricated such that Rn/(Rp+Rn) and the open-circuit potential of the negative electrode of the test cell of Comparative Example 2-2 were respectively substantially the same as Rn/(Rp+Rn) and the open-circuit potential of the negative electrode of the test cell of Comparative Example 2-1.

(Fabrication of Test Cell of Comparative Example 3-1)

A negative electrode active material layer was fabricated by applying the paste on one side of a copper foil such that the coating mass was 0.42 g/100 cm$^2$. Further, by pressing the negative electrode active material layer at a lower pressure than in Working Example 1-1, the porosity of the negative electrode active material layer was made to be 58%. Regarding the other fabrication processes, the same processes as for the test cell of Working Example 1-1 were used to fabricate the test cell of Comparative Example 3-1.

(Fabrication of Test Cell of Comparative Example 3-2)

The paste was applied on each of both sides of a copper foil such that the coating mass for one side was 0.42 g/100 cm$^2$, and was then dried and pressed to fabricate the negative electrode in which the negative electrode active material layer was provided on both sides of the copper foil. Further, by pressing the negative electrode active material layer at a lower pressure than in Working Example 1-2, the porosity of the negative electrode active material layer was made to be 58%. Regarding the other fabrication processes, the same processes as for the test cell of Working Example 1-2 were used to fabricate the test cell of Comparative Example 3-2. Further, the test cell of Comparative Example 3-2 was fabricated such that Rn/(Rp+Rn) and the open-circuit potential of the negative electrode of the test cell of Comparative Example 3-2 were respectively substantially the same as Rn/(Rp+Rn) and the open-circuit potential of the negative electrode of the test cell of Comparative Example 3-1.

(Charge-Discharge Measurement)

A charge-discharge measurement was performed on the test cells of Working Examples 1-1 and 2-1, and Comparative Examples 1-1, 2-1, and 3-1, in each of which the reference electrodes were provided. Specifically, to measure a relationship between the state of charge (SOC) and the open-circuit potential of the negative electrode of each test cell, each test cell was CCCV (constant current-constant voltage) charged at a current value of 0.05 ItA from the SOC of 0% to 100%, and after a break, the test cell was discharged from the SOC of 100% to 0% at a current value of 0.05 ItA. On the basis of the obtained measurement values, the open-circuit potential of the negative electrode was calculated by adding up the operation potentials of the negative electrode during charging and discharging and by dividing the sum by 2.

(Negative Electrode Internal Resistance Measurement)

The terminal voltage and the potential of the negative electrode of each of the test cells of Working Examples 1-1 and 2-1 and Comparative Examples 1-1, 2-1, and 3-1, in each of which the reference electrodes were provided, were measured with the test cell being charged at 0.2 ItA, 0.5 ItA, and 1.0 ItA for 10 seconds in the state where the SOC was 20%. From the measured terminal voltages, the internal resistance value (Rp+Rn) of each test cell was calculated, and from the measured potentials of the negative electrodes, each negative electrode internal resistance value Rn was calculated. Further, (Rn/(Rp+Rn)) was calculated. In this case, the positive electrode internal resistance value Rp is a resistance component (DC resistance) attributed to the positive electrode and a positive electrode reaction, where the resistance component includes: a charge transfer resistance on a boundary surface between the positive electrode and the electrolyte; a solid-phase diffusion resistance in the positive electrode active material layer; a transfer resistance of Li ions in the electrolyte solution between the positive electrode and the reference electrode; and other resistances. The negative electrode internal resistance value Rn is a resistance component (DC resistance) attributed to the negative electrode and a negative electrode reaction, where the resistance component includes: a charge transfer resistance on a boundary surface between the negative electrode, which is strictly an SEI, and the electrolyte; a solid-phase diffusion resistance in the negative electrode active material layer; a transfer resistance of Li ions in the electrolyte solution between the negative electrode and the reference electrode; and other resistances.

Figure 3:
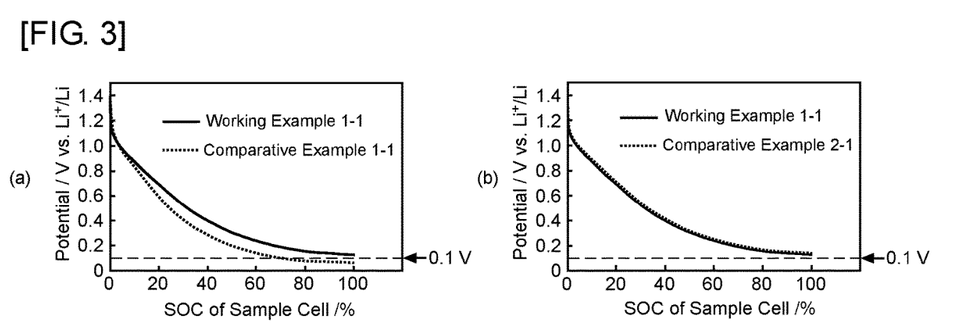
FIG. 3 shows graphs showing results of a charge-discharge measurement.

Table 1 shows the results of the charge-discharge measurement and the negative electrode internal resistance measurement. The minimum value of the open-circuit potential of negative electrode in Table 1 is the minimum value in the entire range of the SOC of 0% to 100%. In addition, FIGS. 3(a) and 3(b) show a change in the open-circuit potential of the negative electrode of each of Working Example 1-1, Comparative Example 1-1, and Comparative Example 2-1 in the charge-discharge measurement in the state where the SOC was 0% to 100%.

Regarding the test cells of Working Examples 1-1 and 2-1, Rn/(Rp+Rn) was smaller than or equal to 0.54, but regarding the test cells of Comparative Example 2-1 and 3-2, Rn/(Rp+Rn) was greater than 0.54.

Further, regarding the test cells of Working Examples 1-1 and 2-1, the minimum value of the open-circuit potential of negative electrode was higher than or equal to 0.1 V (vs. Li/Li$^+$), but regarding the test cells of Comparative Example 1-1 and Comparative Example 3-1, the minimum value of the open-circuit potential of negative electrode was lower than 0.1 V (vs. Li/Li$^+$).

TABLE 1

| Test Cell | Utilization Capacity of Negative Electrode Active Material | Porosity of Negative Electrode Active Material Layer | Minimum Value of Open-circuit Potential of Negative Electrode | Rn/(Rp + Rn) |
| --- | --- | --- | --- | --- |
| Working Example 1-1 | 190 mAh/g | 47% | 0.13 V (vs. $Li^+$/Li) | 0.45 |
| Working Example 2-1 | 190 mAh/g | 53% | 0.14 V (vs. $Li^+$/Li) | 0.52 |
| Comparative Example 1-1 | 250 mAh/g | 47% | 0.06 V (vs. $Li^+$/Li) | 0.47 |
| Comparative Example 2-1 | 190 mAh/g | 62% | 0.14 V (vs. $Li^+$/Li) | 0.61 |
| Comparative Example 3-1 | 220 mAh/g | 58% | 0.09 V (vs. $Li^+$/Li) | 0.57 |

(Cycle Test)

A cycle test was performed on the test cells of Working Examples 1-2, 2-2, and 3-2 and Comparative Examples 1-2, 2-2, 3-2, and 4-2. The cycle test was performed with the test cell disposed in a thermostatic oven set at −10° C. in conformity with the standards for lead rechargeable starter batteries. An upper limit voltage of a cell alone was set to 3.7 V, 3.75 V, or 4.0V, the test cell was CCCV charged up to the SOC of 100% at 5 ItA, the charged test cell was then left unoperated for 10 minutes, and the test cell was discharged at 1 ItA until the voltage became 2.0 V. The discharged test cell was left unoperated for 10 minutes and was charged again. Such a charge-discharge cycle was repeated 20 times. Note that the test cell of Working Example 3-2 and the test cell of Comparative Example 4-2 were test cells fabricated by the same processes as Working Example 1-2, and were respectively charged with the upper limit voltage being set to 3.75 V and 4.0 V.

(Battery Capacity Measurement)

A battery capacity measurement was performed on the test cells of Working Examples 1-2, 2-2, and 3-2 and Comparative Examples 1-2, 2-2, 3-2, and 4-2 before and after the cycle test at 25° C. In the battery capacity measurement, the test cell was CCCV charged at 5 ItA up to the SOC of 100%, and was then discharged at 1 ItA until the voltage became from the SOC of 100% (3.6V) to 2.0V. From the measured value obtained by this discharge, the battery capacity was calculated, and a capacity decrease rate between before and after the cycle test was then calculated.

Figure 4:
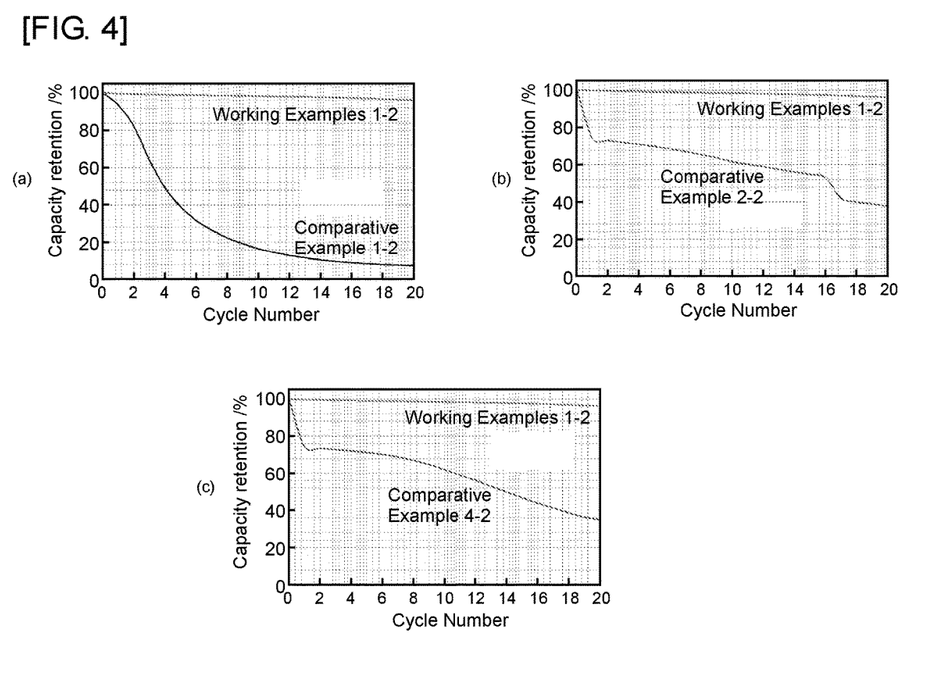
FIG. 4 shows graphs showing results of a cycle test.

Table 2 shows the results of the cycle test and the battery capacity measurement. In addition, FIG. 4 shows the relationship between the cycle number of the test cell of each of the Working Example 1-2 and Comparative Examples 1-2, 2-2, and 4-2 and the capacity retention in the cycle test.

Regarding the test cell of Working Example 1-2, as shown in FIGS. 4(a) to 4(c), it became clear that a decrease in the battery capacity in the cycle experiment was small. In addition, a similar result was obtained also from the test cell of Working Example 2-2. Further, the capacity decrease rate obtained by the battery capacity measurement was 3.8% as shown in Table 2 with respect to the test cell of Working Example 1-2. Further, the capacity decrease rate of the test cell of Working Example 2-2 was 4.2%. Therefore, it has been revealed that the test cells of Working Examples 1-2 and 2-2 exhibited excellent cycle characteristics also at a low temperature of −10° C. Therefore, it is considered that, regarding the test cells of Working Examples 1-2 and 2-2, precipitation of metallic lithium was prevented or reduced even when charging was performed at a temperature of −10° C.

Regarding the test cell of Comparative Example 1-2, as shown in FIG. 4(a), as the cycle number increased, the capacity retention gradually decreased. The capacity decrease rate of the test cell of Comparative Example 1-2 was 90.5% as shown in Table 2. The capacity decrease rate of the test cell of Comparative Example 3-2 was 40.4%. Regarding these test cells, it is considered that metallic lithium was precipitated during charging, leading to reduction in the capacity. Therefore, it has been revealed that, if the negative electrode active material layer is formed such that the minimum value of the open-circuit potential of negative electrode is lower than or equal to 0.09 V (vs. Li/$Li^+$), metallic lithium is precipitated and the cycle characteristics of the test cell is thus impaired. Therefore, it has been revealed that, by forming the negative electrode active material layer such that the minimum value of the open-

TABLE 2

| Test Cell | Utilization Capacity of Negative Electrode Active Material | Porosity of Negative Electrode Active Material Layer | Upper Limit of Charging Voltage | Condition of Negative Electrode After 20 Cycles | Capacity Decrease Rate After 20 cycles (%) |
| --- | --- | --- | --- | --- | --- |
| Working Example 1-2 | 190 mAh/g | 47% | 3.7 V | ○ | 3.8% |
| Working Example 2-2 | 190 mAh/g | 53% | 3.7 V | ○ | 4.2% |
| Working Example 3-2 | 190 mAh/g | 47% | 3.75 V | ○ | 6.8% |
| Comparative Example 1-2 | 250 mAh/g | 47% | 3.7 V | x | 90.5% |
| Comparative Example 2-2 | 190 mAh/g | 62% | 3.7 V | x | 62.5% |
| Comparative Example 3-2 | 220 mAh/g | 58% | 3.7 V | x | 40.4% |
| Comparative Example 4-2 | 190 mAh/g | 47% | 4.0 V | x | 64.7% | circuit potential of negative electrode is higher than or equal to 0.1 V (vs. Li/Li$^+$), precipitation of metallic lithium could be prevented or reduced as in the case of the test cells of Working Examples 1-2 and 2-2 and that excellent cycle characteristics were exhibited.

Regarding the test cell of Comparative Example 2-2, as shown in FIG. 4(b), as the cycle number increased, the capacity retention gradually decreased. The capacity decrease rate of the test cell of Comparative Example 2-2 was 62.5% as shown in Table 2. The capacity decrease rate of the test cell of Comparative Example 3-2 was 40.4%. Regarding these test cells, it is considered that metallic lithium was precipitated during charging, leading to reduction in the capacity. Therefore, it has been revealed that, if the negative electrode active material layer is formed such that Rn/(Rp+Rn) is greater than or equal to 0.57, metallic lithium is precipitated and the cycle characteristics of the test cell is thus impaired. Therefore, it has been revealed that, by forming the negative electrode active material layer such that Rn/(Rp+Rn) is smaller than or equal to 0.54, precipitation of metallic lithium can be prevented or reduced as in the case of the test cells of Working Examples 1-2 and 2-2 and that excellent cycle characteristics are exhibited.

Regarding the test cell of Comparative Example 4-2, as the cycle number increased as shown in FIG. 4(c), the capacity retention gradually decreased. The capacity decrease rate of the test cell of Comparative example 4-2 was 64.7% as shown in Table 2. Regarding this test cell, it is considered that metallic lithium was precipitated during charging, leading to reduction in the capacity. Therefore, it has been revealed that when charging is performed with the upper limit of the charging voltage being set to 4.0 V, metallic lithium is precipitated and that the cycle characteristics of the test cell thus decreases. On the other hand, regarding the test cell of Working Example 3-2, the capacity decrease rate of the test cell was 6.8% as shown in Table 2. Therefore, it has been revealed that, by charging with the upper limit of the charging voltage being set lower than or equal to 3.75 V, precipitation of metallic lithium is prevented or reduced as in the case of the test cells of Working Examples 1-2, 2-2, and 3-2 and that excellent cycle characteristics are exhibited.

DESCRIPTION OF REFERENCE SIGNS

1: casing (lamination film)
2: Welded part
5: electrode assembly housing
7: electrode assembly
8: Positive electrode
9: Negative electrode
10: Separator
12: Positive electrode active material layer
13: Negative electrode active material layer
14: Positive electrode current collector
15: Negative electrode current collector
20a, 20b: Electrode connection terminal
21a, 21b: External connection part
25: Non-aqueous electrolyte
30: Non-aqueous electrolyte secondary battery

What is claimed is:

1. A non-aqueous electrolyte secondary battery comprising: a positive electrode in which lithium iron phosphate is used as a positive electrode active material; a negative electrode in which amorphous-based carbon is used as a negative electrode active material; a separator sandwiched between the positive electrode and the negative electrode; a non-aqueous electrolyte; and a casing which houses the positive electrode, the negative electrode, the separator, and the non-aqueous electrolyte, wherein the non-aqueous electrolyte contains a lithium salt and a carbonate compound, the lithium salt includes at least one selected from the group consisting of LiCF$_3$SO$_3$, LiAsF$_6$, LiClO$_4$, LiBF$_4$, LiPF$_6$, LiBOB, LiN (CF$_3$SO$_2$)$_2$, and LiN(C$_2$F$_5$SO$_2$)$_2$, the positive electrode, the negative electrode, and the non-aqueous electrolyte are configured to satisfy an inequality: (Rn/(Rp+Rn))≤0.54, where Rp is a positive electrode internal resistance attributed to both the positive electrode and a positive electrode reaction during charging of the secondary battery, Rn is a negative electrode internal resistance attributed to both the negative electrode and a negative electrode reaction during charging of the secondary battery, and (Rp+Rn) is an inter-terminal internal resistance of the secondary battery during charging of the secondary battery, Rn/(Rp+Rn)) being measured by using the secondary battery in which a metallic lithium electrode is provided as a reference electrode in such a manner that in a state where a state of charge (SOC) is the same, a terminal voltage, a potential of the negative electrode of the secondary battery containing the reference electrode is measured during 10 seconds of charging at 0.2 ItA, 0.5 ItA, and 1 ItA, from the measured terminal voltages, the internal resistance value (Rp+Rn) of the secondary battery is calculated, from the measured potentials (V vs. Li+/Li) of the negative electrode, the negative electrode internal resistance value Rn is calculated, and from these values, (Rn/(Rp+Rn)) is calculated, the positive electrode, the negative electrode, and the non-aqueous electrolyte are formed so that an open-circuit potential of the negative electrode is higher than or equal to 0.1 V (vs. Li/Li$^+$) and lower than or equal to 1.5 V (vs. Li/Li+) in a state where the SOC of the secondary battery is 0% to 100%, the negative electrode is formed so that a utilization capacity of the negative electrode active material is greater than 0 mAh/g and smaller than or equal to 190 mAh/g, the positive electrode comprises a positive electrode current collector in a sheet shape, and a positive electrode active material layer provided on the positive electrode current collector, and the negative electrode comprises a negative electrode current collector in a sheet shape, and a negative electrode active material layer provided on the negative electrode current collector, wherein the negative electrode active material layer is a porous layer and has a porosity greater than 47% and lower than or equal to 53%.

2. A charging method in which a charging voltage is controlled to be lower than or equal to 3.75 V in the state where the state of charge (SOC) of the secondary battery according to claim 1 is 0% to 100%, wherein the charging voltage is applied between the positive electrode and the negative electrode in charging the secondary battery.

* * * * *